United States Patent [19]
Behringer et al.

[11] Patent Number: 5,639,502
[45] Date of Patent: Jun. 17, 1997

[54] MILK COMPOSITION HAVING REDUCED MINERAL CONTENT

[75] Inventors: Reinhard Behringer, Epalinges; Rafael Berrocal, St-Legier; Rolf Jost, La Tour-De-Peilz, all of Switzerland

[73] Assignee: Nestec S.A., Vevey, Switzerland

[21] Appl. No.: 592,061

[22] Filed: Jan. 26, 1996

Related U.S. Application Data

[62] Division of Ser. No. 162,863, Dec. 6, 1993, Pat. No. 5,503,865.

[30] Foreign Application Priority Data

Dec. 28, 1992 [CH] Switzerland ............. 03971/92
May 18, 1993 [EP] European Pat. Off. ......... 93810367

[51] Int. Cl.$^6$ ................................. A23C 9/00
[52] U.S. Cl. ............... 426/587; 426/491; 426/580; 426/658
[58] Field of Search ............... 426/478, 490, 426/491, 519, 521, 522, 580, 586, 587, 588, 800, 801, 658, 601

[56] References Cited

U.S. PATENT DOCUMENTS

| | | | |
|---|---|---|---|
| 4,244,971 | 1/1981 | Wargel et al. | 426/35 |
| 4,462,932 | 7/1984 | Lonergan | 426/580 |
| 4,497,836 | 2/1985 | Marquardt et al. | 426/239 |
| 4,994,441 | 2/1991 | Neeser | 514/8 |
| 5,015,628 | 5/1991 | Reynolds | 514/12 |
| 5,143,741 | 9/1992 | Podolski et al. | 426/565 |
| 5,223,299 | 6/1993 | Dalan et al. | 426/587 |
| 5,229,159 | 7/1993 | Schwan | 426/587 |

FOREIGN PATENT DOCUMENTS

| | | |
|---|---|---|
| 2644983 | 10/1990 | France . |
| 2212380 | 7/1989 | United Kingdom . |

OTHER PUBLICATIONS

Coquin, et al., Dialog Abstract No. 008463599 of French Patent No. 2644983 (1990).

Madinier, Abstract, International Patent Application Publication No. WO92/14475 (1992).

Fauquant, et al. "Microfiltration of Milk Using A Mineral Membrane", Food Sci. and Tech. Abstracts No. 88–10–P0221 (1988).

*Primary Examiner*—Leslie Wong
*Attorney, Agent, or Firm*—Vogt & O'Donnell, LLP

[57] ABSTRACT

A sterilized milk composition is based upon the natural constituents of milk and has reduced phosphorous, sodium, potassium and citrate contents. The composition is derived, in particular, from skimmed milk and has a non-fat dry matter solids content which includes, by weight based upon the weight of the non-fat solids, from 33% and 36% protein, 48% to 58% lactose and 3% to 5% minerals, and the minerals include a calcium content in an amount of from 75% to 100% of that of the skimmed milk, a phosphorous content in an amount of from 50% to 75% of that of the skimmed milk, a sodium content in an amount of from 5% to 20% of that of the skimmed milk, a potassium content in an amount of from 5% to 20% of that of the skimmed milk and a citrate content in an amount of from 10% to 30% of that of the skimmed milk.

11 Claims, No Drawings

MILK COMPOSITION HAVING REDUCED MINERAL CONTENT

CROSS REFERENCE TO RELATED APPLICATION

This application is a divisional application of application Ser. No. 08/162,863, filed Dec. 6, 1993, now U.S. Pat. No. 5,503,865.

BACKGROUND OF THE INVENTION

The present invention relates to a dairy composition.

Evaporated milk is characterised by a relatively high concentration of minerals present in its soluble phase, in particular ions not linked to the casein micelle, such as sodium and potassium cations, and anions such as chloride and certain phosphates and citrates. Up until now, attempts have been made, in particular, to stabilise evaporated milk during the technological process of concentration by evaporation by adding stabilising salts thereto, such as citrates and phosphates, to protect the proteins during the preservation heat-treatment and to avoid the thickening and separation of the phases during storage. These salts, by increasing still further the proportion of minerals not linked to the micelle, have the effect of impairing the organoleptic qualities of the milk, particularly its taste. In addition, the heat-treatment assists the stabilisation of the evaporated milk but affects its taste and whiteness.

A process is known, for example, from French Patent Application Publication No. 2 644 983, for preparing a liquid composition which uses microfiltration or ultrafiltration of skimmed milk in order to produce, based on a residue with a reduced lactose content, a composition in which the lactose is replaced by a non-milk sugar, for example a fruit and starch sugar. The overall composition of this product is no longer the same as that of milk.

SUMMARY OF THE INVENTION

The object of the invention is to provide a dairy composition approximating milk, based on natural components of milk having organoleptic and dietetic characteristics which are appreciably improved compared with evaporated milk.

The composition according to the invention is characterised by the fact that it contains, by weight of non-fat solids, 33 to 36% protein, 48 to 58% lactose and 3 to 5% minerals, and by the fact that, amongst the minerals, the calcium content is 75 to 100% of that of milk, the phosphorus content is 50 to 75% of that of milk, the sodium and potassium contents are each 5 to 20% of that of milk and the citrate content is 10 to 30% of that of milk. The composition thus is based upon natural constituents of milk and has a reduced phosphorus sodium, potassium and citrate content as compared with the milk from which it is derived.

DETAILED DESCRIPTION OF THE INVENTION

In the above definition of the invention, and in the remainder of the description, the percentages and contents stated result from analysis of the substances by the usual analysis methods applied to milk.

Within the scope of the invention, the milk may come from any mammalian milk-bearing female, for example cattle, goats or sheep.

The composition according to the invention may be in a concentrated liquid form, for example with 20–30% by weight of non-fat dry matter, or diluted to a greater or lesser extent by reconstituting with water or an aqueous liquid. It may contain up to 15% by weight of fats. It may also be in the form of a powder after drying, for example by spray drying, intended to be reconstituted in a liquid form by the addition of water or an aqueous liquid.

It has been found that the composition according to the invention has remarkable organoleptic properties characterised by increased smoothness and a clean fresh taste compared with milk and especially compared with evaporated milk, and improved whiteness compared with evaporated milk. In addition, it has, in a concentrated form, remarkable stability in storage, without precipitation of salts, for example calcium citrate.

The invention also provides a process for preparing the above composition, characterised in that skimmed milk is concentrated by ultrafiltration or microfiltration to a factor of 3 to 6 times by volume and in that, in the retentate, a quantity of lactose is dissolved corresponding, by weight, to approximately the quantity of dry matter in the retentate.

Preferably, the original skimmed milk is pasteurised.

According to a first embodiment of the process, the above liquid mixture is dried, for example by spray drying or freeze drying.

In a second embodiment of the process, the liquid concentrate is mixed with previously sterilised cream, the mixture is homogenised and is then hermetically packaged in containers, and the containers are sterilised, for example in an autoclave.

In a preferred embodiment of the process according to the invention, the retentate and an aqueous lactose solution are sterilised separately, the retentate and lactose solution are mixed aseptically, previously sterilised milk fat is added thereto, and the mixture is homogenised and aseptically packaged in containers.

Where applicable, the mixture is post-sterilised under moderate conditions of heat before being packaged aseptically.

As a variant of the operations following homogenisation, the homogenised mixture may be packaged in containers which are closed hermetically, and which are then sterilised under moderate conditions of heat, for example in an autoclave.

In the process of the invention, it is preferred to concentrate previously pasteurised skimmed milk by using microfiltration on mineral membranes preferably having a porosity of approximately 0.1 to 0.2 microns. Ultra-filtration can also be used for this operation, but there is a preference for microfiltration, which affords a better permeation rate and a higher concentration than those obtained by ultrafiltration (for example, up to six times by volume). Unlike ultrafiltration, which allows the retention of whey proteins, microfiltration largely eliminates them. In a particularly preferred version of this process, the microfiltration is continued with a washing or diafiltration operation, at constant volume, for example with a volume of demineralised water approximately three times that of the retentate. The aim of this operation is an additional reduction in the minerals not bound to the casein micelle, in particular the sodium and potassium cations. After the diafiltration, concentration can preferably be carried out once again, for example until a dry matter content of approximately 20% by weight is obtained.

It may be desirable to keep some of the whey proteins in the retentate whilst using microfiltration for the purpose of increasing the proportion of dry matter of protein origin. To do this, the original skimmed milk is heat treated under relatively severe conditions, at a temperature of 90° C. to 140° C. and for a period of 20 s to 10 min, the highest temperature corresponding to the shortest period and vice versa. This treatment brings about the aggregation of the whey proteins and the retention of the aggregates.

The permeate of the microfiltration or ultrafiltration constitutes a useful raw material which can be demineralised, for example by ion exchange and/or electrodialysis in order to be used, for example, in baby products.

When it results from microfiltration, this permeate also has the advantage of having a low microbe content.

As mentioned previously, the preferred process is the one in which the retentate and lactose are sterilised separately from each other. To do this, the retentate is preferably sterilised by ultra high temperature (UHT), at 120°–150° C. and preferably 130°–140° C. Sterilisation takes place by maintaining this temperature for 15 to 60 s. The lactose is dissolved in hot demineralised water at the highest possible concentration, for example at saturation. Sterilisation of the lactose is used at a temperature and for a duration comparable to those applicable to the retentate, which causes any lactose remaining in suspension to be redissolved. This lactose solution, once sterilised, is maintained at a temperature of 50° C. or more and mixed with the retentate, preferably at 50°–60° C., so as to prevent recrystallisation of the lactose before and during the mixing. Preferably, the pH (measured at 50°–60° C.) is adjusted if necessary to a value >6.8, for example by the addition of an aqueous solution of calcium hydroxide.

After addition of the previously sterilised milk fat, in the form of butter oil or cream, the subsequent homogenisation preferably takes place at 50°–55° C. in two stages, for example at a pressure of 10–30 MPa for the first stage and 2.5–5 MPa for the second.

Whatever the variant of the post-sterilisation stage, for example by UHT or in an autoclave, the conditions used correspond to moderate heat treatment, preferably, in the case of UHT treatment at 135°–145° C. for 3–5 s, for example at approximately 140° C. for 3 s, or 120°–125° C. for 1–3 min, and for example at approximately 121° C. for 2 min in the case of treatment in an autoclave. It is possible to use mild treatment conditions since the microorganisms have been completely inactivated during the relatively severe sterilisation treatment of the retentate and lactose. In this way the effect of Maillard's reaction is minimised.

The dairy composition obtained constitutes a base, characterised by excellent qualities of smoothness and taste, for products such as concentrates, desserts and culinary or dietetic products, for example with a low sodium content.

The following examples illustrate the invention. In these examples, the parts and percentages are by weight, unless otherwise indicated.

EXAMPLES

Example 1

250 kg of skimmed milk is pasteurised at 72° C. for 14 s and is then subjected to tangential microfiltration on a TECHSEP S 151 unit fitted with CARBOSEP M 14 membranes with a total surface area of 3.2 m². The operation is carried out at 50° C. until the milk/retentate volume ratio is 6. At this stage the dry matter content of the retentate is 24% and the permeation flow is 1/3 of its initial value. Its dry matter content is then adjusted to 20% and lactose is added thereto at 2 kg of lactose per 10 kg of retentate. The mixture is agitated at 50° C. until the lactose is completely dissolved and is then dried by freeze drying.

The powder obtained has the composition indicated in Table 1 below in comparison with that of skimmed milk, expressed as a percentage of the total solid matter (including the residual moisture).

TABLE 1

|  | % of total solid matter | |
| --- | --- | --- |
| Constituent | Example 1 | Skimmed milk |
| Protein (N × 6.38) | 35 | 35 |
| Fat | 1 | 1 |
| Lactose | 57.6 | 51.9 |
| Ash | 4.2 | 7.8 |
| Citrate | 0.5 | 1.7 |
| Ash, including | | |
| Calcium | 1.1 | 1.3 |
| Phosphorus | 0.7 | 1.0 |
| Potassium | 0.3 | 1.6 |
| Sodium | 0.1 | 0.6 |

After reconstitution with demineralised water so as to obtain 48 g of lactose/kg, the liquid composition obtained from the powder was assessed organoleptically in comparison with pasteurised skimmed milk with the same lactose content and with a skimmed milk powder dried by spray drying low temperature and reconstituted with water, with the same lactose content. The panel of tasters found that the composition according to the invention had a smoothness and taste which were much more pleasant than the pasteurised or recombined skimmed milk.

Example 2

A composition containing 23% of non-fat solids and 10% fat is produced by homogenising appropriate quantities of the retentate/lactose mixture of Example 1 and cream, sterilised by UHT, having a 35% fat content, and then sterilising the homogenised product in an autoclave.

Tasting the composition obtained showed that it was smoother than a traditional evaporated milk with the same proportions of non-fat solids and fats, even more marked than in the case of a non-concentrated milk.

Example 3

250 l of skimmed milk is pasteurised at 72° C. for 14 s and is concentrated by microfiltration as in Example 1 until a milk/retentate volume ratio of 3 is obtained. At this stage, diafiltration of the retentate against demineralised water is carried out until 250 l of permeate is produced. The introduction of demineralised water is then stopped and the retentate is then concentrated to a final volume of 40 l. After the addition of lactose in proportions of retentate solids to lactose solids of 0.442 to 0.558 until the lactose is completely dissolved, the mixture is dried by spray drying.

The powder obtained has the composition shown in Table 2 below.

TABLE 2

| Constituent | % of total solid matter | |
|---|---|---|
| | Example 3 | Skimmed milk |
| Protein (N × 6.38) | 35 | 35 |
| Fat | 1 | 1 |
| Lactose | 57.5 | 51.9 |
| Ash | 3.5 | 7.8 |
| Citrate | 0.3 | 1.7 |
| Ash, including | | |
| Calcium | 1.1 | 1.3 |
| Phosphorus | 0.7 | 1.0 |
| Potassium | 0.2 | 1.6 |
| Sodium | 0.04 | 0.6 |

After reconstitution with water as in Example 1, and after the addition of cream as in Example 2, respectively, the liquid composition obtained from the powder had a smoothness and taste which were much more pleasant than the pasteurised or recombined skimmed milk with the same non-fat solid content, and the full cream milk with the same non-fat solid and fat contents, respectively.

Example 4

250 l of skimmed milk is heat treated at 135° C. for 21 s in UHT equipment. This treatment brings about an almost complete denaturation of the whey proteins. Microfiltration with diafiltration of the milk thus treated is then carried out as in Example 3, and then the retentate is concentrated to 1/6 of the initial volume of milk. Analysis of the total proteins contained in the retentate shows that 6.11 kg of proteins is obtained, whilst 5.65 kg of proteins is obtained by the process of Example 3. It can be concluded from this that the retention of the whey proteins was appreciably improved by the heat treatment of the milk. The lactose content is then adjusted and the mixture is then dried as indicated in Example 3.

The powder obtained has the composition indicated in Table 3 below.

TABLE 3

| Constituent | % of total solid matter | |
|---|---|---|
| | Example 4 | Skimmed milk |
| Protein (N × 6.38) | 35 | 35 |
| Fat | 1 | 1 |
| Lactose | 56.4 | 51.9 |
| Ash | 3.4 | 7.8 |
| Citrate | 0.3 | 1.7 |
| Ash, including | | |
| Calcium | 1.0 | 1.3 |
| Phosphorus | 0.7 | 1.0 |
| Potassium | 0.2 | 1.7 |
| Sodium | 0.04 | 0.6 |

After reconstitution with water as in Example 1, and with the addition of cream as in Example 2, respectively, the liquid composition obtained from the powder had the same qualities of smoothness and taste as the compositions of Examples 1, 2 and 3. This means that the presence of denaturated whey proteins in the retentate in no way effects the organoleptic qualities of the compositions, the protein yield being moreover increased.

Example 5

Skimmed milk is pasteurised at 72° C. for 15 s, and is then concentrated by microfiltration on a mineral membrane with a nominal pore dimension of 0.2 microns, until a volume of retentate is obtained equal to 1/6 of the volume of milk put in. Diafiltration of the retentate is then carried out at constant volume with 3× its volume of demineralised water, and it is then concentrated to 20% of dry matter. The retentate is then sterilised at 135° C. for 20 s by UHT and is placed in a sterile tank.

Separately, lactose is dissolved in demineralised water, at 80° C. and at a concentration of 60%, that is to say the maximum possible. The lactose is not completely dissolved, but its complete dissolution is obtained when it is subsequently treated by UHT at 135° C. for 30 s. After sterilisation, the lactose is stored in a sterile tank.

The retentate and lactose solution are then mixed aseptically in proportions corresponding, for 87% of proteins out of the total solids of the retentate, to 40% of retentate solids for 60% of lactose solids. This mixing is carried out under agitation at 50°–60° C. Cream with a 35% fat content, previously sterilised by UHT, is then added to this mixture in an appropriate quantity to obtain 23% non-fat solids for 10% fat, at 50°–55° C. The pH is then adjusted to 6.8–6.9 (determined at 50°–60° C.) by the addition of an aqueous dispersion of calcium hydroxide, if it does not already have this value.

The mixture is then homogenised at 50°–55° C. in two stages, the first at 15 MPa and the second at 3 MPa, and it is then post-sterilised at 140° C. for 5 s and is packed aseptically in containers.

The dairy composition has a lightness of 84.55 (L value measured by spectrophotometry on MACBETH 2000) and 5.83% of blocked lysine. By comparison, a commercially available evaporated milk has a lightness of 75.49 L and 36.98% blocked lysine.

Example 6

The process is carried out as in Example 5 except for the post-sterilisation, which is carried out in an autoclave at 120° C. for 2 min after packing the product in hermetically sealed containers.

The dairy composition has a lightness of 80.77 L and 13.84% blocked lysine.

We claim:

1. A sterilized milk composition derived from a skimmed milk and comprising non-fat dry matter solids which comprise, by weight based upon the weight of the non-fat solids, from 33% and 36% protein which comprises casein micelle, 48% to 58% lactose and 3% to 5% minerals and wherein the minerals include a calcium content in an amount of from 75% to 100% of that of the skimmed milk, a phosphorus content in an amount of from 50% to 75% of that of the skimmed milk, a sodium content in an amount of from 5% to 20% of that of the skimmed milk and a potassium content in an amount of from 5% to 20% of that of the skimmed milk and wherein citrate is in an amount of from 10% to 30% of the skimmed milk citrate content.

2. A milk composition according to claim 1 wherein the non-fat dry matter solids are in an amount of from 20% to 30% by weight based upon the weight of the composition.

3. A milk composition according to claim 1 further comprising a fat.

4. A milk composition according to claim 2 further comprising a fat.

5. A milk composition according to claim 3 wherein the fat is in an amount of up to 15% by weight based upon the weight of the composition.

6. A milk composition according to claim 4 wherein the fat is in an amount of up to 15% by weight based upon the weight of the composition.

7. A milk composition according to claim 1 wherein the composition has a pH of at least 6.8.

8. A milk composition according to claim 1 wherein the composition has a pH of from 6.8 to 6.9.

9. A milk composition according to claim 1 wherein the protein further comprises denatured whey protein.

10. A milk composition according to claim 1 wherein the composition is a microfiltered retentate.

11. A milk composition according to claim 1 wherein the composition is an ultrafiltered retentate.

* * * * *